United States Patent [19]

Fitelson et al.

[11] 4,204,262

[45] May 20, 1980

[54] OPTICAL SIGNAL PROCESSING APPARATUS

[76] Inventors: Michael M. Fitelson, 214 Stonecrest Dr., Dewitt, N.Y. 13214; Dennis R. Morgan, 7734 Forestwag Ct., Liverpool, N.Y. 13088

[21] Appl. No.: 800,155

[22] Filed: May 25, 1977

[51] Int. Cl.$^2$ ............................ G06G 9/00; G06G 7/19
[52] U.S. Cl. ...................................... 364/822; 333/150; 343/9 PS; 364/826; 364/861; 367/64; 367/103
[58] Field of Search ............... 364/713, 821, 822, 826, 364/827, 861; 343/100 SA, 9 PS; 340/6 R, 16 R; 310/313, 314, 318; 333/150, 154; 358/209, 213

[56] References Cited

U.S. PATENT DOCUMENTS

| | | | |
|---|---|---|---|
| 3,555,180 | 1/1971 | Cook | 358/209 X |
| 3,766,559 | 10/1973 | Butcher, Jr. et al. | 343/100 SA |
| 3,836,712 | 9/1974 | Kornreich et al. | 358/209 |
| 4,065,791 | 12/1977 | Kowel et al. | 358/213 |
| 4,071,907 | 1/1978 | Casasent | 364/822 |

OTHER PUBLICATIONS

Blackledge et al.; Investigation of Display Techniques Using Elastic Surface Waves and Local Storage IEEE Journal Solid-State, vol. SC-5, No. 4, Oct. 1970, p. 244/249.

Kowel et al.; Progress on Two-Dimensional Direct Electronic Fourier Transform (DEFT) Devices 1974 Ultrasonics Symposium Proceedings IEEE Cat. #74CHO, pp. 763-767.

Casasent et al.; Electro-Optical Processing of Phased-Array Antenna Data; IEEE Transactions on Aerospace and Electronic Systems, vol. AES-11, No. 1, Jan. 1975, pp. 65-75.

Kornreich et al.; DEFT: Direct Electronic Fourier Transforms of Optical Images, Proceedings of the IEEE, vol. 62, No. 8, Aug. 1974, pp. 1072-1087.

*Primary Examiner*—Felix D. Gruber

[57] ABSTRACT

Signal processing apparatus having the capability to perform simultaneous space-time processing of sonar, radar and similar time-varying signals, and to effect the Fourier transform of multiple time-varying signals through electro-optical photoelastic means, photoconductive means, or photoemissive means.

9 Claims, 3 Drawing Figures

OPTICAL SIGNAL PROCESSING APPARATUS

BACKGROUND OF THE INVENTION

This invention relates to new and improved apparatus for processing electrical signal and, in particular, to a photo-acoustic space-time processor for multiple time-varying signals such as received by a sonar or radar system utilizing a plurality of signal receiving elements formed as an array.

Array radar and sonar systems detect incoming signals by means of receptor elements which are suitably spaced with respect to one another to form an array in a manner well known in the art. The relative amplitudes and phases of incoming signals received at each of the receptor elements of the array are processed both to establish a desired radiation pattern or beam and to extract the desired intelligence signal from the received signals in the direction of the beam. Processing the received signals is effected by detecting and combining the individual element sonar or radar signals so as to determine beam direction from their relative phase relationships and to obtain the intelligence signal from their time variations in amplitude and frequency.

A typical linear array will produce a radiation pattern or beam which is of fan shape; a two-dimensional array commonly yields a beam that has a conical shape. The beam may be directed or steered either by physically changing the orientation of the array or by electronically varying the relative phases of the signals detected by the elements of the array. The electronic method usually is preferred and, in the past, has normally been accomplished by differentially varying the phase delay of the signals detected by the antenna array elements with one or more phase shifters.

The range and reliability of an array radar or sonar can be improved by increasing the number of receiving elements. However, additional receiving elements require additional phase shifters and supporting electronic controls so that as the system becomes more sophisticated, the associated electronic circuitry expands and becomes correspondingly more complex. The subject invention overcomes such disadvantages by providing a single photo-acoustic space-time signal processor for beamforming and steering all the elements of the array, thus reducing the per-element cost and complexity of the array processor.

It is well known in the prior art that light signals may be passed through an acoustic medium and modulated by an interacting sound wave. One such device is described in U.S. Pat. No. 3,111,666 (R. M. Wilmotte, Nov. 19, 1963). In that patent, a reference light signal is passed sequentially through two birefringent acoustic delay lines. The first delay line is excited by a signal representative of the transmitted pulse and the second delay line is excited by a signal representative of the echo pulse. At some point along the delay line, the two signals will correlate and light intensity will be a maximum. The distance along the delay line at which correlation occurs is sensed by a video receiver and provides a measure of the range of the target. Other acousto-optical signal processors are described in U.S. Pat. No. 3,421,003 (G. J. Pratt, Jan. 7, 1969) and U.S. Pat. No. 3,634,749 (Robert M. Montgomery, Jan. 11, 1972). However, in each of the foregoing cited patents, the light signal is an unmodulated reference signal and no means are provided for simultaneously space and time processing the received signal nor for processing multiple signals received from an array as is accomplished by the present invention.

It is also well known in the art to use a method and apparatus for directly converting an optical image into an electrical signal representative of the spatial Fourier transform of the image by interacting the optical image with sound waves (U.S. Pat. No. 3,836,712-Kornreich et al). This method and apparatus is termed a "direct electronic Fourier transform", sometimes referred to by the acronym DEFT. It relies on the recognition that certain media have special properties that permit deriving electrical signals representative of the optical image incident on the media. By projecting an optical image onto such a medium, and then inducing an acoustic surface wave or bulk wave of given acoustic frequency in the medium, it is possible to derive a signal which is representative of the spatial Fourier transform of the optical image for that frequency. By sweeping the acoustic frequencies through a desired bandwidth, the entire optical image may be converted into a series of Fourier transforms.

It is an object of this invention to provide a new and improved device and a method for the simultaneous space and time processing of electrical signals such as radar or sonar signals.

It is another object of this invention to provide a new and improved device and method for forming and scanning sonar and radar beams.

It is a further object of this invention to provide a new and improved means and method for photoacoustic processing of radar, sonar and other signals of time-varying phase-related character.

SUMMARY

This invention relates to a new and improved method and apparatus for simultaneous space and time processing of a multiplicity of phase-related time-varying signals. In accordance with the invention, a direct electronic Fourier transform (DEFT) apparatus may be coupled to the source of a plurality of time-varying signals having predetermined phase relationships between them. Such source may, for example, be a like plurality of the receptor elements of a radar antenna array or sonar transducer array, in which case the apparatus will provide an output corresponding to the received signals on one or more steerable beams of the radar or sonar. Another such source may be a plurality of delay line output taps, in which case the apparatus will provide an output corresponding to the Fourier transform of the time-waveform supplied to the delay line input.

In the specific embodiments illustrated and hereinafter described the invention utilizes an array of light signal source elements with inter-element geometry and spacing corresponding to that of the receptor elements of the sonar or radar array, but scaled greatly down to the appropriate size of a DEFT device. The light signals may be generated by any suitable sources, such as light emitting diodes (LED's) with each source driven by the received signal from one of the array elements. The intensity of the light from each light signal source then is proportional to the intensity of the radiation detected by the corresponding array element. The output of each light source is directed onto an acoustic transmission medium in the DEFT apparatus thereby providing on the surface of the medium a light pattern comprising a plurality of individual light spots each of varying intensity representative of the radiation sensed by one of the array elements. The impinging light source outputs are modulated in the medium by inducing either a bulk or surface acoustic wave in the medium. Each light signal is differently affected depending upon its relative position with respect to the medium and the amplitude and frequency of the induced acoustic wave at that point in the medium. The foregoing effects are combinatory and result in an output which represents the integrated intensity of the input signal when viewed in a given direction, i.e. the direction of the radar or sonar beam thus formed. The direction of the beam may be steered or scanned by changing or sweeping the frequency of the acoustic wave induced in the medium.

The acoustic transmission medium in which this modulation of the light signals takes place possesses a measurable property that varies as a function of incident light and as a function of the time and space-varying strain disturbances (acoustic waves) within the medium. In one form, the medium comprises an optically transmissive substrate disposed between two substantially parallel cross-polarized plates. When subjected to strain the substrate rotates the angle of polarization of incident light, and the change in rotation is measured by monitoring the light emerging from the second polarizer. In another form, the medium comprises a substrate having an electrical property such as voltage, current or conductance that varies as a combined function of incident light intensity and local strain disturbances. The changes in the property are measured by conventional means well known in the art. In yet a third embodiment of the invention, the medium comprises a substrate having photoemissive properties, and the output signal is generated by measurement of the electron emission.

In addition to beam forming and steering, the optical signal processor of the invention may also perform matched filtering of the beam output signals. Due to the convenient availability of the necessary reference signal input point, such output filtering may readily be accomplished with relatively little additional circuit complexity or cost in the processor of this invention.

DETAILED DESCRIPTION

Figure 1:
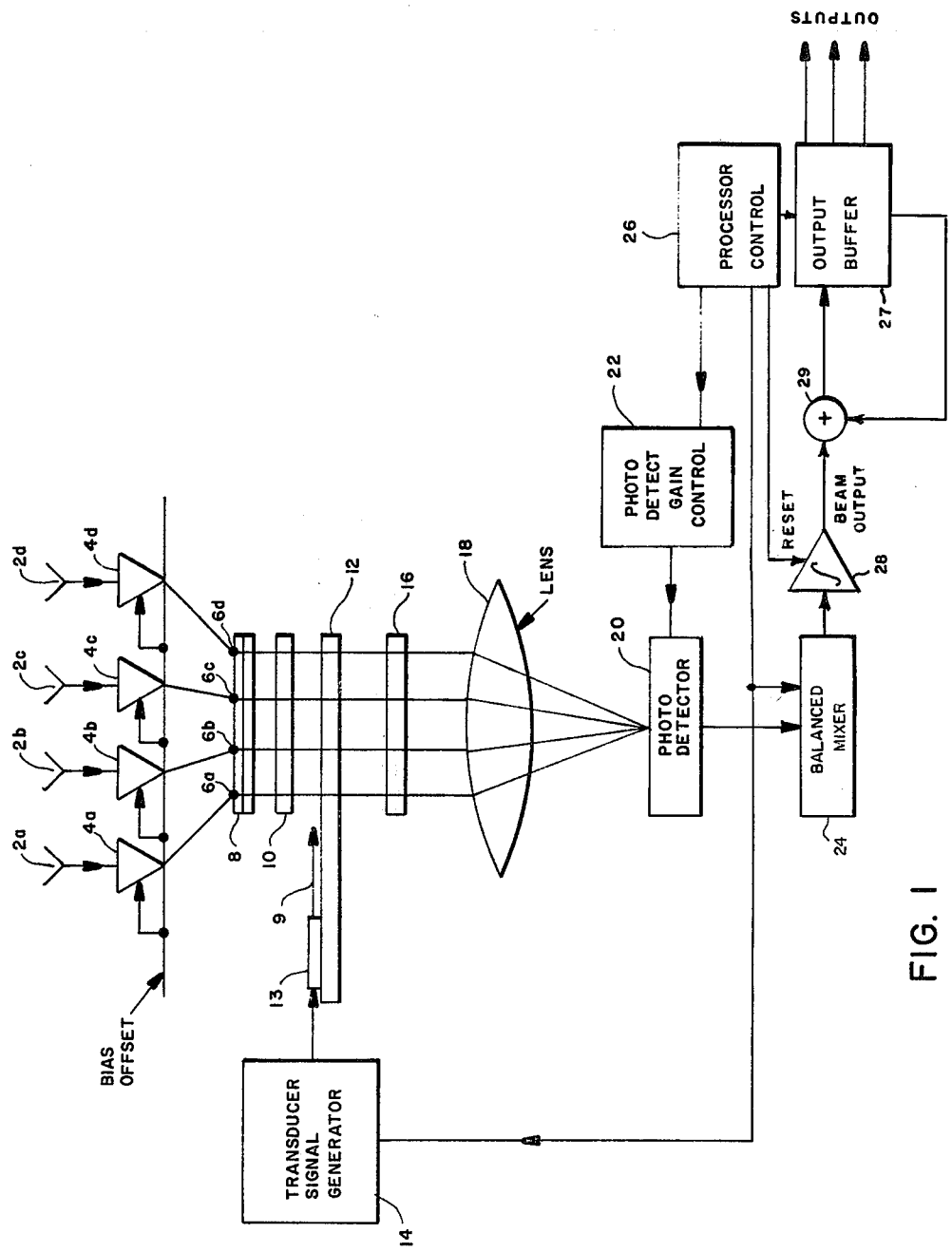
FIG. 1 is a schematic illustration of the invention using the photoelastic effect.

Referring now to the drawings, and more particularly to FIG. 1, an embodiment of the invention is shown using the electro-optic or photoelastic effect. Illustratively, FIG. 1 shows a linear array of four radiation receptor elements 2a, 2b, 2c, and 2d, which may be either sonar transducer elements or radar antenna elements, each providing an electrical signal output of amplitude varying directly with the amplitude of the received signal at that receptor. It will of course be appreciated that the number of array elements is not limited to four, but rather is limited only by practical and spatial arrangements of the radar or sonar system to which the invention is applied. Although only a linear array is shown, it will also be understood that the invention may readily be applied to two-dimensional arrays, with beam forming and steering in both horizontal and vertical planes, simply by duplication of the equipments hereinafter described.

Signals received by corresponding array elements 2a-d are amplified by amplifiers 4a, 4b, 4c, and 4d having a common "bias offset" input as shown, which provides sufficient voltage offset to assure that the amplifier outputs to LED's 6a-d remain always of the same polarity. Each of the amplifiers is connected to drive one of an array of four light emitting diodes (LED's) 6a, 6b, 6c and 6d. LED's 6a-d are arrayed in a line and are relatively spaced from each other a distance that is proportional to the relative spacing between the receptor elements 2a-d from which the LED drive signals are obtained. The light signals emitted by LED's 6a-d pass through a collimator 8 which transmits parallel rays of light and blocks divergent light. The parallel light rays from collimator 8 then pass through a first polarizer 10 by means of which the light signals are polarized in a first plane. After leaving polarizer 10, the light signals enter substrate 12.

Substrate 12 preferably is formed of glass, but it may be formed of any optically transmissive material having suitable electro-optic or photoelastic properties. Illustratively, such other materials include quartz, silica, birefringents such as lithium niobate ($LiNBO_3$), and other optically transmissive materials having the property of locally changing the angle of polarization of light passing through the material when a mechanical strain is applied to the material. The foregoing property of the glass or other material comprising substrate 12 results in a phase shift of the component of incident light in the direction of the propagation of the applied mechanical strain.

Coupled to substrate 12 is an acoustic transducer 13 driven by a signal generator 14 which is in turn driven by a variable frequency (sweep or step) oscillator forming part of the processor 26. The transducer 13 receives an electrical time-varying signal from the signal generator 14 and transforms it into mechanical vibrations. Hence, an acoustic surface wave 9 is generated on substrate 12 and this acoustic surface wave 9 intersects the incident light emitted by LED's 6a-d. The component of incident light that is oriented in the same direction as acoustic wave 9 is phase shifted in proportion to the amplitude and frequency of the acoustic wave 9 existing at that point. Phase shifted light emerging from the substrate 12 passes through a second polarizer 16.

The polarizing plates 10 and 16 are substantially parallel and are disposed at an angle approximately 90° between their respective planes of polarization. With no acoustic signal, all of the light signals emitted by the LED's 6a-d are substantially blocked by the interaction of polarizers 10 and 16. When an acoustic wave 9 is induced in substrate 12, the angle of polarization for the light signals emitted by LED's 6a-d and passing through glass 12 is appropriately rotated (phase shifted) and the rotated light which emerges from second polarizer 16 represents the combined input signals as modulated by surface acoustic wave 9.

Light emerging from polarizer 16 is gathered by lens 18 and focused onto photodetector 20, thus providing a light signal input to the photodetector which represents the summed amplitudes of all the light signals as incident on the strain-sensitive medium 12 and modulated by the strain waves propagating therethrough. The gain of photodetector 20 is governed by gain control 22, so the photodetector output is the product of the gain control setting and the focused light signal input. The output of the photodetector 20 is combined with the acoustic drive signal in a synchronous demodulator comprised of mixer 24 and integrator 28. The integration time interval is suitably selected and controlled by a processor control unit 26; preferably this time interval is determined by dividing the Nyquist sampling interval, which is dictated by the signal bandwidth, by the desired number of beams to be formed. At the end of each integration interval, the integrator output is transferred to and stored in an output buffer 27 at a location therein corresponding to a particular beam direction as determined by the acoustic transducer drive frequency set by the processor control 26. The stored beam outputs can be separately drawn upon for display or additional processing.

For purposes of matched-filtering the beam outputs, processor control 26 can also provide a reference signal that is representative of the original transmitted sonar or radar signal. The reference signal is applied through control 22 to modulate the gain of the photodetector 20 correspondingly to a modulation impressed on the transmitted signal. The photodetector output then is a signal comprising the product of the gain control setting adjusted in accordance with this reference signal, and the combined light signal input as modulated by the surface acoustic wave. Following synchronous demodulation, the output buffer 27 and adder 29 are used to accumulate successive beam outputs weighted by the modulated gain control values over the duration of the reference signal, thus forming the matched filtered output signal.

Thus the processor control 26 comprises means for performing a number of functions necessary to the beam steering and matched filtering operations. In support of the beam steering function, control 26 includes a conventional sweep or step frequency oscillator the output of which drives the transducer signal generator 14 and is applied also to the mixer 24 for demodulating the photodetector output. Periodically, at time intervals determined as stated in the foregoing, control 26 applies a signal to the output buffer 27 causing it to sample and store the output of integrator 28, and concurrently supplies a signal to the integrator for resetting or "dumping" it preparatory to the next integration. In support of the matched filtering function, control 26 also comprises means for deriving from the transmit signal a reference signal which is applied to the photodetector gain control thereby to introduce a modulation function such as to provide the desired impulse response for matched filter operation as described.

The qualitative operation of the device shown in FIG. 1 can be explained as follows. Assume the device has M channels and consider the $m^{th}$ channel of the system. Let $s_m(t)$ be the $m^{th}$ input channel signal. The intensity of the $m^{th}$ LED is given by $$I_m(t) = I_o(1 + s_m(t)) \quad \text{Eq. 1}$$

The light signal from each LED is polarized at 45° to the z-axis (the direction of propagation of the acoustic wave 9). After emerging from substrate 12, the polarization vector becomes $$\vec{A} = I_m^{\frac{1}{2}}(t)[\exp(j\omega_L t)\vec{i}_y + \exp\{j[\omega_L t + \alpha \cos(\omega_A t - k_A x_m)]\}\vec{i}_z] \quad \text{Eq. 2}$$

where $\omega_L$ is the frequency of the LED light signal, and $\omega_A$ and $k_A$ are the acoustic wave frequency and wave number, respectively. The term, $\alpha \cos(\omega_A t - k_A x_m)$, is the phase shift of the z-component of polarization due to the acoustic wave 9. The quantity $\alpha$ is proportional to the acoustic wave 9 amplitude and depends on the properties of substrate 12. In most cases, $\alpha$ is small compared to unity.

The modulated light signals pass through a second polarizer 16 that is oriented at 90° to the first polarizer 10 and subsequently impinge on photo-detector 20. The output of photodetector 20 is given by $$V_{out}^m(t) = I_m(t) |e^{j\omega_L t} - e^{j[\omega_L t + \alpha \cos(\omega_A t - k_A x_m)]}|^2 \quad \text{Eq. 3}$$
$$= \frac{\alpha^2}{2} I_0 [1 + s_m(t)][1 + \cos(2\omega_A t - 2k_A x_m)]$$

The resultant light signals are collected simultaneously by the photodetector 20. By synchronous detection at $2\omega_A$, (twice the acoustic frequency) one can construct the desired output $$V(t) = \frac{\alpha^2}{2} I_o \sum_{m=1}^{M} s_m(t) e^{-2jk_A x_m} \quad \text{Eq. 4}$$

Equation 4 indicates that photodetector output will vary linearly with changes of input signal strength. The foregoing result applies to a one-dimensional Fourier transform or the beam output of a line array. Each acoustic drive frequency $\omega_A$ corresponds to a different Fourier component or beam output. By sweeping the frequency $\omega_A$, in either step-wise or continuous manner, the resultant Fourier components are phase shifted, which corresponds to an angular rotation of the beam output, i.e., beam scanning.

Figure 2:
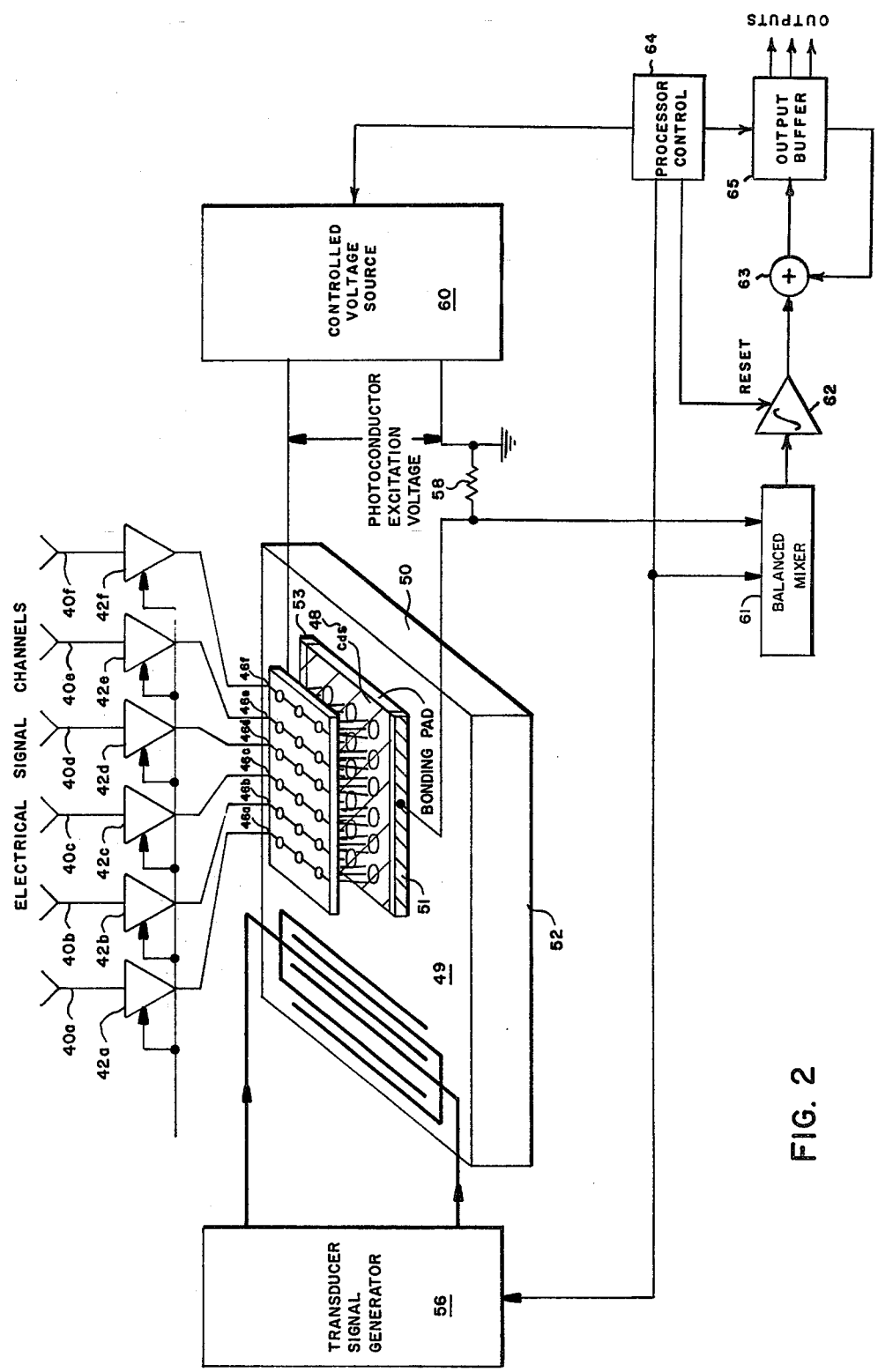
FIG. 2 is a schematic illustration of the invention using the photoconductive effect.

An embodiment of the invention which uses the photoconductive effect is shown in FIG. 2. Sonar or radar signals are detected by a line array of elements and supplied to inputs 40a-f. The detected signals at inputs 42a-f are amplified by amplifiers 42a-f, each of whose outputs drives a corresponding LED in a line array 46a-f. Each line array 46a-f illustratively comprises three series-connected LED's that provide LED light signals. The invention may utilize a preselected number of such LED's with the number depending on the desired sensitivity. LED arrays 42a-f are relatively spaced from each other a distance that is proportional to the relative spacing between array elements 42a-f. The light signals emitted by each of the LED's in a given array, such as 46a, will represent the incoming sonar or radar signal received at the corresponding array element 40a.

The LED light signals are projected onto a film 48 which is formed of cadmium sulfide, an intrinsic semiconductor material. Film 48 may also be formed of any other suitable semiconductor material whose conductance varies as a function of incident light and induced mechanical deformation. Film 48 is secured to a surface of piezoelectric substrate 52 by bonding pad 50. Substrate 52 is a bar of fused quartz, preferably AT cut, but other piezoelectric materials may be used. A surface acoustic wave 49 is induced on substrate 52 by means of a signal generator 56 whose output is received by acoustic transducer 54 which in turn is coupled to substrate 52. The surface acoustic wave 49 that is induced in substrate 52 has the effect of locally altering the conductance of the exposed film strip 48.

A dc operating voltage is provided across the film strip 48 by a controlled voltage source 60. A pair of electrically conductive contacts 51, 53 are disposed over a portion of film strip 48. Contacts 51, 53 are in electrical contact with film 48 and are spaced from each other to expose a portion of the film 48. Contact 53 is connected to one side of the controlled voltage source 60 and contact 51 is connected to one end of resistor 58. The other end of resistor 58 is connected to the other side of the controlled voltage source 60 thereby forming a series circuit comprising the controlled voltage source 60, resistor 58, contact 51, film strip 48 and contact 53.

The conductance of film strip 48 varies with the applied light signals from LED's 46a-f and the strain waves induced by transducer 54. The current in the series circuit will fluctate in response to the changes in the conductance of film strip 48. The foregoing current fluctuations form electrical signals which represent the summed amplitudes of all the light signals incident upon and modulated by the film strip 48, and which thus represent the detected sonar or radar signals coming from a given direction, i.e., a beam. The acoustic signal generator 56 changes the frequency of the acoustic waves applied by transducer 54, thereby time-varying the conductance of film strip 48 in a manner such that the current across film strip 48 is correspondingly phase shifted. Phase shifting the current signal corresponds to scanning the formed beam over the sonar or radar target area. Processor control 64 may be set to sweep acoustic generator 56 through a predetermined range of acoustic frequencies whereby the film current is uniformly phase shifted and the formed beam scans the target area.

The electrical current changes can be measured by a number of means well known in the art. In the apparatus of FIG. 2, the means used are the voltage signals that appear across resistor 58. Since film 48 is in series with resistor 58, the same current will flow in both and the voltage across the resistor is representative of the current flowing through film 48.

The signal across resistor 58 is connected as the input to a synchronous demodulator comprised of balanced mixer 61 and integrator 62 and the output is transferred to and stored in the output buffer 65 all in a manner similar to that described above in reference to FIG. 1. It is also possible to perform matched-filtering of the output signal in the embodiment of FIG. 2, by modulating the photoconductor excitation voltage output of the controlled voltage source 60 in a manner analogous to the control of photodetector gain in FIG. 1.

The operation of the device as shown in FIG. 2 can be described in qualitative terms as follows. A light signal I(x) produced by LED's 46a-f falls on the cadmium sulfide (CdS) film 48. The surface acoustic wave 49 that is propagated in the fused quartz substrate 52 sets up a strain wave (x,t) in the cadmium sulfide film 48. The conductivity per unit length of the film is $$g(x,t) = 1/h[\sigma_D + \sigma_L I(x) + \sigma_{DS}(x)\Sigma(x,t) + \sigma_{LS} I(x)\Sigma(x,t)] \quad \text{Eq. 5}$$

where h is the width of the exposed CdS film 48, $\sigma_D$ is the dark conductance, $\sigma_L$ is the change of the conductance with the light signal I(x), $\sigma_{DS}$ is the change in the dark conductance with strain $\Sigma(x,t)$, and $\sigma_{LS}$ is the change of the conductance with light flux and strain.

With a dc operating voltage applied by correlation voltage signal generator 60, the total current between the electrical contacts 51 and 53 is given by $$i(t) = V_o \int_0^a g(x,t)dx \quad \text{Eq. 6}$$

where a is the length of the CdS film $V_o$ is the applied voltage.

If the CdS film 48 is well prepared $\omega_D$ and $\omega_{DS}$ are small compared to $\omega_L$ and $\omega_{LS}$, respectively, so the first and third terms of Eq. 5 have a negligible contribution to the current described in Eq. 6 and can thus be ignored.

Furthermore, if surface wave 49 is chosen to be a monochromatic traveling wave, then $$\Sigma(x,t) = \Sigma_O e^{j(\omega t - kx)} \quad \text{Eq. 7}$$

The integral of the second term of Equation 5 will result in a dc current contribution, but the integral of the fourth term yields a detectable, dominant ac signal.

$$i(t) = (V_o \sigma_{LS} \Sigma_O/h)\exp(j\omega t) \int_O^a I(x)\exp(-jkx)dx \quad \text{Eq. 8}$$

Thus by synchronously demodulating the dominant ac component, one obtains the spatial (one-dimensional) Fourier transform of the light pattern by the sweeping acoustic frequency. The significance of this is that one can obtain a Fourier component by a single current measurement over the period of the sweep.

As shown in FIG. 2, electrical signals 40a-f may be derived from corresponding sonar or radar elements, and these electrical signals are used to drive light emitting diodes (46a-f). By spacing the LED array 46a-f to scale down the array size commensurate with the surface acoustic wave dimensions one can handle arrays which are vastly larger in dimension than the spaced LEDs.

For a spacing, d, between the LED's and a surface acoustic wave propagated in the direction of the x axis, the dominant ac current at frequency $\omega$ satisfies $$i(t) \approx V(t)e^{j\omega t}\sum_{m=0}^{N-1} e^{-jkmd}I(md,t) \quad \text{Eq. 9}$$

To avoid having to use a surface acoustic wave transducer with a large bandwidth-to-center-frequency ratio, a carrier frequency for the surface acoustic wave transducer 54 is chosen which is high enough to permit a small percentage bandwidth to cover all the desired Fourier components (beams). The LED's are spaced so that $k_o md$ is an integer multiple of $2\pi$, where $k_o$ is the wave number of the lowest frequency used. Then $k = k_O = \Delta k$ and $\omega = kc$, where c is the speed of sound in the quartz substrate 52. The desired Fourier components (beams) are generated by sweeping $\Delta k$ from zero to the desired maximum value. Then $$i(t) \approx V(t)e^{j\omega t}\sum_{m=0}^{N-1} e^{-jk0md}e^{-j\Delta kmd}I(md,t) \quad \text{Eq. 10}$$

$$= V(t)e^{j\omega t}\sum_{m=0}^{N-1} e^{-j\Delta kmd}I(md,t) \quad \text{Eq. 11}$$

Figure 3:
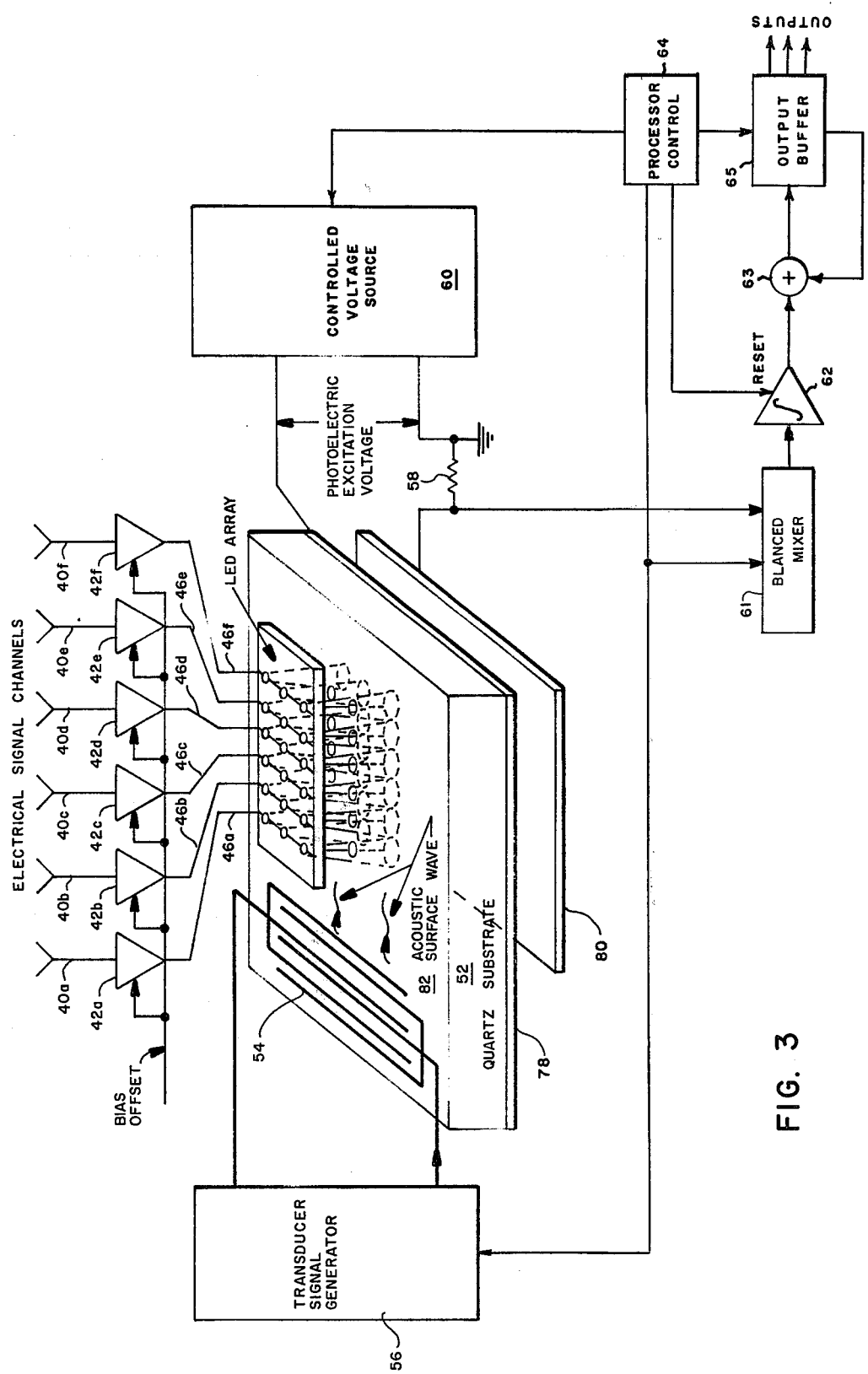
FIG. 3 is a schematic illustration of the invention using the photoemissive effect.

Another embodiment of the invention, which uses the photoemissive effect, is shown in FIG. 3. This photoemissive apparatus uses many of the elements that were previously identified in the foregoing description of the photoconductive apparatus shown in FIG. 2, so the elements of FIG. 3 that bear the same reference numerals as the elements of FIG. 2 operate in the same manner as those of FIG. 2. Instead of the intrinsic semiconductor film 48 of FIG. 2, the apparatus of FIG. 3 has a photocathode film 78 which is bonded to one surface of an optically transmissive quartz substrate 79. Light signals from LED arrays 46a–f enter the surface of the quartz substrate opposite the surface to which photocathode film 78 is bonded. Light passing through substrate 52 is modulated by vibrations induced in the substrate by an acoustic transducer 54 coupled to the substrate and controlled by transducer signal generator 56. The magnitude and frequency of the output of transducer signal generator 56 is controlled by processor control 64. Modulated light impinges upon photocathode 78 which emits electrons in accordance with the well known photoemissive effect. Emitted electrons strike photoelectron collector 80 which is positioned parallel to photocathode film 78 and suitably spaced therefrom.

A dc potential difference is established between the film 78 and the collector 80 by controlled voltage source 60. The photoelectron current passing between photocathode film 78 and photoelectron collector 80, and through the resistor 58 in series therewith, is a current signal that represents the received sonar or radar signals. The voltage across resistor 58 is applied to the input of balanced mixer 61 and integrator 62 which function in the same manner as in FIG. 2. Similarly, the processor control 64 and output buffer 65 function in the same manner as described in reference to FIG. 2 to store and, if desired, to matched-filter the output signal.

For the photoemissive apparatus, the current in the photoelectron collector 80 has as its largest component $$\vec{i}(t) = \Phi_{LS} e^{j\omega t} \int I(\vec{r}) \exp(-j\vec{k}\cdot\vec{r}) d^2\vec{r} \qquad \text{Eq. 12}$$

where $\vec{k}$ is the direction of propagation of the surface acoustic wave, and $\Phi_{LS}$ is the elasto-photoemissive coefficient. Thus, the photoemissive device has similar properties to the photoconductive device. Insofar as the arrangement of LED's 40a–f and the choice of surface acoustic wave frequencies are concerned, they are identical to those of the photoconductive device shown in FIG. 2.

The photoemissive device has several attractive properties. Its response time is inherently fast since it is governed by the time it takes an electron to leave the surface after interacting with a photon. This time is less than $10^{-8}$ seconds. It is an inherently linear process since the current is directly proportional to the number of electrons striking the photoelectron collector 80, which in turn is directly proportional to the light intensity.

The signal processing apparatus of the invention has utility also with sources of multiple time-varying signals other than array radar and sonar systems. For example, the Fourier transform of the multiple time-varying signal outputs of a tapped delay line, having a time-varying signal applied to the line input, may readily be obtained by connecting each of the delay line taps to one LED of an array similar to those illustrated in FIGS. 1–3. The light output of the LED array then is processed in essentially the same manner as described with reference to those figures.

Modifications and variations of the described specific embodiments will be apparent to those skilled in the art. Accordingly, it is to be understood that the described specific examples of the present invention are presented merely by way of example to facilitate a complete understanding of the invention, and such modifications, changes or variations as are embraced by the spirit and scope of the following claims are deemed to be within the scope of the present invention.

What is claimed as new and desired to be secured by Letters Patent of the United States is:

1. A simultaneous space and time signal processing apparatus for use with a source of a plurality of phase-related time-varying input signals, comprising:
   (a) acousto-optic means including a strain-sensitive light transmissive medium and means for inducing time and space varying strain disturbances in said medium;
   (b) a light source array comprising a plurality of light sources of number corresponding to the number of said time-varying signals and spatially interrelated correspondingly to the phase relationships of said input signals, each of said light sources being driven by one of said input signals to produce a light output signal corresponding to the drive signal amplitude and being positioned adjacent said medium to project such light output signals thereon, the light signals thus incident upon said acousto-optic means being modulated by said light transmission medium in accordance with the time and space varying strain disturbances therein;
   (c) means for sensing the light signals incident upon and modulated by said acousto-optic means and for deriving therefrom an electrical signal which is representative of the summed amplitudes of the light signals so sensed; and
   (d) means for demodulating said electrical signal to produce an output signal representative of the time-varying input signals having a predetermined phase relationship.

2. The simultaneous space and time signal processing apparatus of claim 1 wherein each of said light signal sources is a light emitting diode.

3. The simultaneous space and time signal processing apparatus of claim 1 further comprising means for integrating the derived output signal over sequential time periods of predetermined duration.

4. The simultaneous space and time signal processing apparatus of claim 1 further comprising means for modulating the derived output signal with a reference signal corresponding to a component of at least one of said time-varying input signals for matched-filtering of the output signal.

5. The simultaneous space and time signal processing apparatus of claim 1, wherein said acousto-optic means comprises:
   (a) first and second substantially parallel polarizing elements aligned so as to enable transmission of light therethrough and disposed with their respective planes of polarization substantially orthogonal;
   (b) a body of elasto-optical material disposed intermediate the polarizing elements, and
   (c) means for vibrating said elasto-optical body at a plurality of frequencies;
   wherein said light source array projects its light output signals onto said first polarizing element, and wherein said sensing means is responsive to light emerging from the second polarizing element.

6. The simultaneous space and time signal processing apparatus of claim 1, wherein said acousto-optic means comprises:

(a) a medium capable of undergoing time and space varying strain disturbances, (b) a film secured to said medium to undergo said strain disturbances with said medium, said film having an electrical property which varies as a function of light impinging on the film and as a function of time and space varying strain disturbances in the film, and (c) means for causing a plurality of different time and space varying strain disturbances in the medium; wherein said light source array projects its light output signals onto said film; and wherein said sensing means is responsive to said electrical property variations in said film to produce said electrical output signal.

7. A wave energy reception system for forming and directing a beamed wave energy reception pattern and for detecting time-varying signals received in the direction of the beam, comprising:

(a) a receptor element array comprising a plurality of wave energy receptor elements ordered in a geometrical array and providing a like plurality of received signal outputs with predetermined phase relationships between said outputs dependent upon the array geometry;

(b) a like plurality of light sources each driven by one of said received signal outputs to produce a light output of intensity corresponding to the drive signal amplitude, said light sources being arranged in dimensionally scaled, geometrically related configuration to said receptor element array;

(c) acousto-optic means including a strain-sensitive light transmissive medium and means for inducing in said medium time and space varying strain disturbances of predetermined frequency;

(d) means for directing the light output from said plurality of light sources onto said light transmissive medium at points thereon arranged in dimensionally scaled, geometrically related configuration to said receptor element array, the light signals thus incident upon said acousto-optic means being modulated by said light transmissive medium in accordance with the time and space varying strain disturbances therein;

(e) means for sensing the light signals incident upon and modulated by said acousto-optic means and for deriving therefrom an electrical signal which is representative of the summed amplitudes of the light signals so sensed; and (f) means for demodulating said electrical signal to produce an output signal representing the time-varying wave energy signal received in a beam direction determined by the frequency of said strain disturbances.

8. The combination of claim 7, further including means for changing the frequency of said strain disturbances, thereby to change the direction of the beam formed by the apparatus.

9. The combination of claim 7, further including means for sweeping the frequency of said strain disturbances, thereby to scan the beam formed by the apparatus through an angle determined by the sweep frequency extremes.

* * * * *